United States Patent Office 3,231,109
Patented Jan. 25, 1966

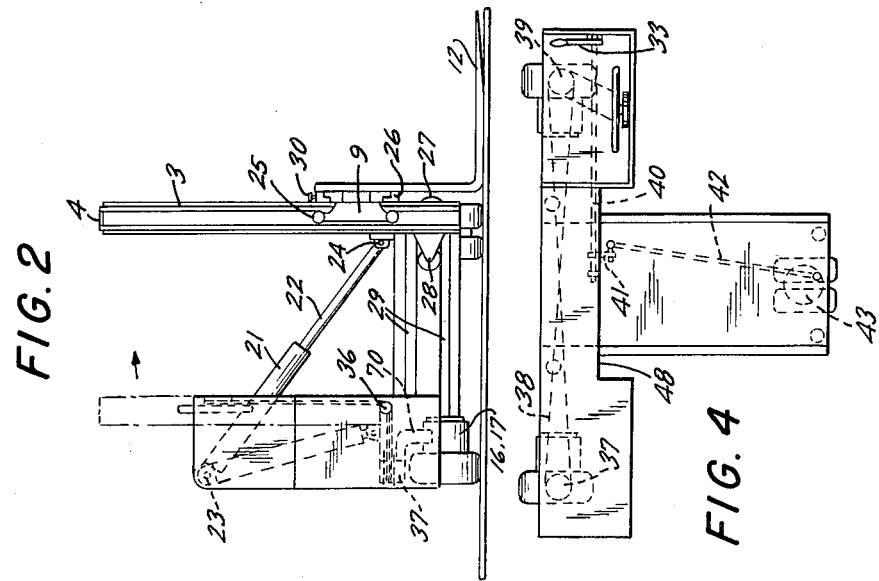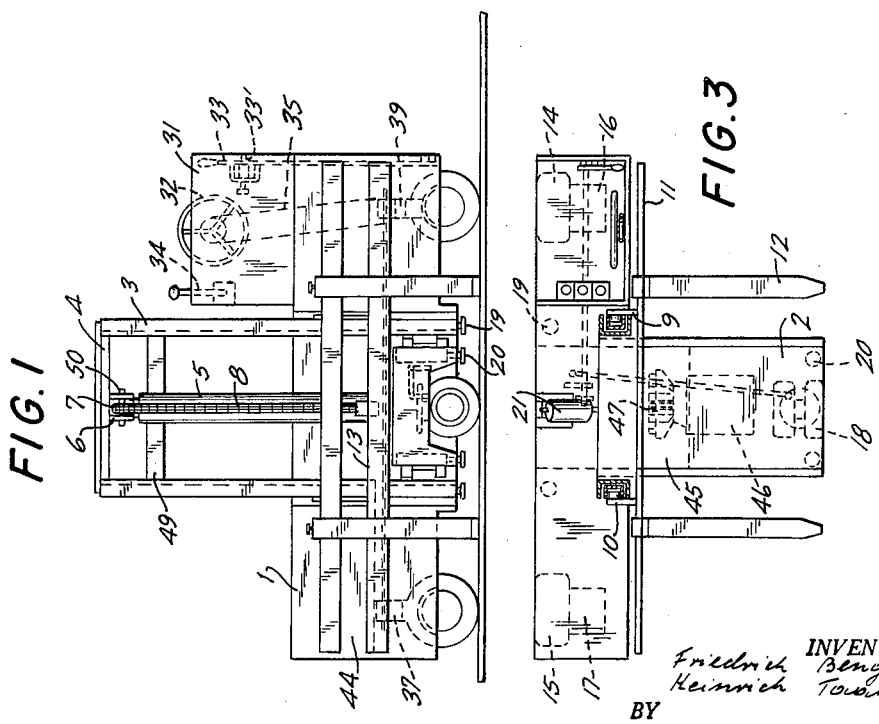

3,231,109
MATERIAL HANDLING MACHINE
Friedrich Bengel, and Heinrich Taake, Hochberg, Kreis Ludwigsburg, Germany, assignors to Albert Irion Nachf., Stuttgart-Muenster, Germany
Filed Feb. 27, 1958, Ser. No. 718,020
Claims priority, application Germany, Apr. 26, 1957, J 13,150; Aug. 7, 1957, J 13,558
8 Claims. (Cl. 214—75)

The present invention relates to material handling machines.

More particularly the present invention relates to that type of material handling machine generally known as fork lift trucks and the like.

With machines of this type it is conventional to locate at the front end of the machine the structure which raises and lowers the material which is transported. However, with this conventional construction it is sometimes extremely difficult, if not impossible, to have access to material located at the side of the machine, particularly where there is not sufficient room for the machine to turn so that it is capable of having its front end directed toward the material which it to be transported.

Although attempts have been made to overcome this problem, a fully satisfactor solution has not yet been found. All known structures for overcoming this problem suffer from the defects of having too small a lifting force, weakening the entire structure so that it is not stable, and greatly increasing the weight as well as the cost of the machine.

One of the objects of the present invention is to overcome the above drawbacks by providing a material handling machine which is of inexpensive rugged construction and which can easily handle materials located along opposite sides of a relatively narrow aisle in which a conventional fork lift truck or the like could not maneuver.

Another object of the present invention is to provide a material handling machine which is capable of reliably handling extremely long loads of easily bendable material.

A further object of the present invention is to provide a machine of the above type which can change its direction of movement through a sharp angle on the order of 90°.

An additional object of the present invention is to provide a machine of the above type which is capable of being easily controlled by the operator.

With the above objects in view the present invention includes in a machine for handling materials an elongated vehicle portion and a main frame extending upwardly from the elongated vehicle portion. A guide means is carried by the elongated vehicle portion and cooperates with the main frame to guide the latter for movement along the elongated vehicle portion, and a means is carried by the main frame for raising and lowering the material which is to be transported. This elongated vehicle portion is an auxiliary vehicle portion which is fixed to and extends laterally from a longitudinal main vehicle portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side elevational view of a material handling machine constructed according to the present invention;

FIG. 2 is an end view of the machine of FIG. 1;

FIG. 3 is a top plan view of the machine of FIG. 1;

FIG. 4 is a top plan view of the machine showing only the vehicle portions thereof with the plurality of wheel means arranged in a position different from that of FIGS. 1 and 3;

Figure 5:
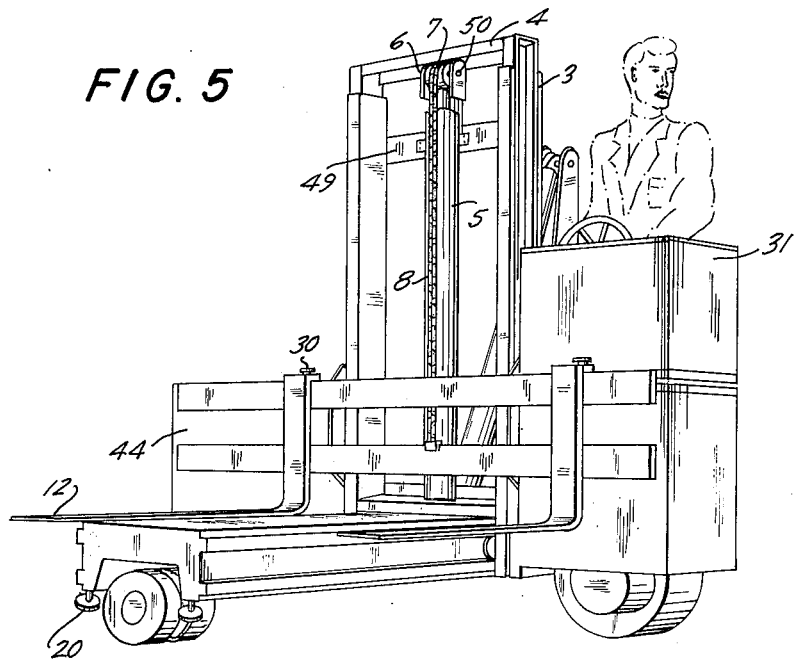
FIG. 5 is a perspective view of the machine of FIGS. 1-4 with the wheels thereof arranged as shown in FIGS. 1-3 and with the material lifting structure retracted.

Referring now to FIGS. 1-4, the machine of the present invention includes a longitudinal main vehicle portion 1 which is of substantial height and of substantially rectangular configuration. A substantially flat auxiliary vehicle portion 2 is fixed to and extends laterally from the longitudinal vehicle portion 1 and is located substantially midway between the ends thereof, the auxiliary vehicle portion 2 having a height which is only a small fraction of the height of the vehicle portion 1 and being located adjacent the bottom of the vehicle portion 1.

A main frame 3 extends upwardly from the auxiliary vehicle portion 2, and a guide means is carried by the vehicle portion 2 for guiding the main frame 3 for movement back and forth along the vehicle portion 2 transversely of the longitudinal vehicle portion 1. This guide means takes the form of a pair of parallel rails 29 fixed to each side of the auxiliary vehicle portion 2 and extending along substantially the entire length thereof. A pair of rollers 27 and 28 (FIG. 2) roll between each pair of rails 29 and are turnably connected with each of a pair of vertically extending channel members which form part of the main frame 3. The pair of vertical channel members are interconnected by a cross frame member 49 (FIG. 1), and the interiors of the elongated channel members are directed outwardly away from each other, as is particularly evident from FIG. 3.

The main frame 3 carries a means for raising and lowering the material which is to be transported, and this latter means includes an auxiliary frame 4 which is vertically movable with respect to the main frame 3. The auxiliary frame 4 includes a pair of elongated channel members which are respectively nested in the pair of vertical channel members of the main frame 3 for vertical, telescopic sliding movement with respect thereto, and the vertical channel members of the auxiliary frame 4 are interconnected at their top ends by a cross frame member which extends across the tops of the vertical members of the main frame 3.

Thus, the interiors of the vertical channel members of the auxiliary frame 4 are also directed outwardly away from each other, as is also shown in FIG. 3, and these interiors of the vertical channel members of the auxiliary frame 4 respectively receive rollers 25 which are guided for vertical movement by the vertical channel members of the auxiliary frame 4. These rollers 25 are turnably connected with a fork carrier 9 (FIGS. 2 and 3), and the fork carrier 9 includes the elongated parallel members 11 which are substantially coextensive with the main longitudinal vehicle portion 1, as is particularly evident from FIGS. 1 and 3. Thus, the parts 9 and 11 are fixedly connected with each other to form a unitary carriage connected with the rollers 25 and cooperate with the auxiliary frame 4 for vertical movement. A pair of fork-forming members 12 are carried by the members 11 and the positions of the members 12 along the members 11 may be adjusted so that the distance between the fork-forming elements is capable of being adjusted up to a maximum distance which is substantially equal to the length of the main vehicle portion 1. As is apparent particularly from FIG. 2, each fork-forming element 12 fixedly carries at its rear face substantially hook-shaped elements 26 which pass partly around the members 11 so as to support the fork-forming elements 12 for sliding movement along the elements 11, and manually turnable clamping screws 30 are threadedly carried by the upper elements 26 to be turned into engagement wtih the upper member 11 for holding the fork-forming elements 12 in their adjusted positions.

The main frame 3, together with the above-described means carried thereby for raising and lowering the material which is to be transported, is shifted back and forth along the auxiliary vehicle portion 2 transversely of the longitudinal vehicle portion 1 by a hydraulic moving means which in the illustrated example takes the form of a cylinder 21 pivotally connected at 23 to the main vehicle portion 1 (FIG. 2) and a piston 22 slidable in the cylinder 21 and pivotally connected at 24 to a cross frame member of the main frame 3 which is parallel to and located below the cross frame member 49 and which is also interconnected with the pair of vertical channel members of the main frame 3. Thus, by introducing hydraulic liquid under pressure into the cylinder 21, the piston 21 will be moved out of the same so as to shift the main frame 3 together with all of the structure carried thereby from the left dot-dash line position illustrated in FIG. 2 to the right solid line position shown in FIG. 2, and of course the direction of liquid flow in the cylinder 21 may be reversed to return the main frame 3 and the structure carried thereby to its rest position where it is located in a shallow cutout of substantially rectangular configuration formed in the right side face of the longitudinal vehicle portion 1, as viewed in FIG. 2. This cutout 48 is shown most clearly in FIG. 4, and the position of the main frame 3 in the cutout is also illustrated in FIG. 3.

The lower cross frame member of the main frame 3 which is pivotally connected at 24 with the piston 22 fixedly supports a vertical cylinder 5 the piston of which extends upwardly through the top open end of the cylinder 5. The top end of this latter piston is bifurcated to receive the sprocket wheel 7 which is turnably supported by a shaft 50 extending through the bifurcations at the top end of the piston which extends upwardly beyond the cylinder 5, and this shaft 50 also extends through a pair of bearing members fixed to and extending downwardly from the top cross member of the auxiliary frame 4. Thus, when liquid under pressure is introduced into the cylinder 5, the piston therein will move upwardly in order to raise the auxiliary frame 4 as well as the sprocket wheel 7. A sprocket chain 8 passes around the sprocket wheel 7, is fixed at one end to the cross frame member 49 of main frame 3, and is fixed at its opposite end to the lower horizontal member 11 of the carriage 9, 11. Therefore, the introduction of liquid under pressure into the bottom end of the cylinder 5 will not only raise the auxiliary frame 4, but in addition the upwardly moving sprocket wheel 7 will act through the chain 8 on the carriage 9, 11 to raise this carriage, and it will be noted that with this arrangement the carriage 9, 11 moves upwardly at twice the speed of the auxiliary frame 4. Moreover, the auxiliary frame 4 does not participate in supporting the load. The entire load is carried by the main frame 3 and the liquid under pressure within the cylinder 5.

The longitudinal main vehicle portion 1 is provided with a pair of lower cavities wihch respectively receive parts of a pair of wheel means 14 and 15 which are respectively located adjacent the ends of the main vehicle portion 1. The pair of wheels 14 and 15 are respectively connected with electric motors 16 and 17 to be driven thereby, and as is apparent from FIG. 2, each of the motors is fixed to an L-shaped bracket 70 which is in turn fixed to a vertical stub shaft supported for turning movement about its axis in a suitable bearing carried by the longitudinal vehicle portion 1. Thus, FIG. 1 shows these shafts 37 and 39 which are respectively connected through the brackets 70 with the motors 16 and 17 to support the wheels 14 and 15 for turning movement. The shafts 37 and 39 fixedly carry sprocket wheels which cooperate with a crossed chain 38 shown most clearly in FIG. 4, and thus the turning of one of the wheels 14 and 15 in one direction will produce a turning of the other of these wheels in an opposite direction.

The auxiliary vehicle portion 2 is connected with a third wheel means 18 in the form of a double wheel assembly which is turnably connected by a suitable bearing structure with the auxiliary vehicle portion 2 for turning movement about a vertical axis. In the position of the parts shown in FIG. 3, the wheel means 18 is incapable of turning with respect to the vehicle portion 2 and all of the steering is accomplished by the turning of the wheels 14 and 15 in opposite directions. Any suitable releasable lock means (referred to below) is provided for preventing turning of the wheel means 18 with respect to the auxiliary vehicle portion 2.

The vertical shaft which is connected with the wheel means 18 and which is supported for turning movement by a suitable bearing of the auxiliary vehicle portion 2 fixedly carries a disc to which one end of a rod 42 is pivotally connected adjacent the outer periphery of this disc or ring. The opposite end of the rod 42 is pivotally connected with the top end of a rigid lever 41 whose bottom end is fixed with a horizontal shaft 40 which is supported for turning movement about its axis by suitable bearings of the longitudinal vehicle portion 1 (FIG. 4). The bottom of a manually turnable lever 33 is also fixed with the shaft 40 and the top end of the lever 33 is accessible to the operator and is situated at the stand 31 which forms the right end of the vehicle portion 1, as viewed in FIG. 1. The steering wheel 32 is located at the stand 31, and a sprocket wheel which turns with the steering wheel 32 cooperates with a chain 35 which extends downwardly from the latter sprocket wheel, passes around a pair of guide sprockets 36 (FIG. 2) and then passes around a second sprocket wheel fixed to the shaft 39 and located above the sprocket wheel on this shaft which is in mesh with the chain 38. As a result, the turning of the steering wheel 32 will result in turning of the wheel 14, and the turning of the latter is transmitted through the chain 38 to the wheel 15 to turn the latter in a direction opposite to the wheel 14.

The parts have the position shown in FIGS. 1–3 when the machine is to be moved longitudinally of the main vehicle portion 1, which is to say to the right and left as viewed in FIGS. 1 and 3. In order to move the vehicle transversely of the longitudinal vehicle portion 1, the operator sets a plurality of hydraulic jacks 19 and 20 into operation. A pair of hydraulic jacks 19 are arranged adjacent the side of the main vehicle portion 1 which is distant from the vehicle portion 2, and a pair of hydraulic jacks 20 are arranged adjacent the free end of the auxiliary vehicle portion 2. When hydraulic liquid under pressure is introduced into these jacks, they move downwardly from the vehicle portions 1 and 2, engage the floor, and raise the entire vehicle. Then the steering wheel 32 is turned so as to locate the wheels 14 and 15 in the position shown in FIG. 4 where they are turned through 90° with respect to the positions of FIG. 3, and also the wheel means 18 is unlocked so that it is free to turn. The wheel 18 is locked by locking the lever 33 against movement, and when this lever is released for movement the wheel 18 is unlocked. FIG. 1 shows a spring pressed pin 33' passing through an opening of the lever 33 and carried by the latter, and the spring acts on this pin to move it into an opening in the side wall of stand 31 so that lever 33 is locked in this way, and the operator need only pull the pin 33' out of the opening in the wall of stand 31 to release lever 33 together with wheel 18 for turning movement. Then the operator turns the lever 33 so as to turn the wheel 18 from the position of FIG. 3 to that of FIG. 4, and thereafter the hydraulic liquid is removed from the jacks 19 and 20 so that the vehicle 1, 2 lowers to place the wheels in engagement with the floor while the movable hydraulic jack members continue to rise upwardly to their rest positions indicated in FIG. 1. With the parts in the position shown in FIG. 4, the steering wheel 32 is locked so as to prevent turning of the wheels 14 and 15, and the lever 33 is manipulated to turn the wheel 18 for steering the vehicle when it moves transversely of the main vehicle portion 1.

The fluid under pressure for the cylinders 21 and 5, as well as for the hydraulic jacks, is derived from a liquid reservoir 45 formed in the interior of the auxiliary vehicle portion 2. The pump 47 pumps liquid from its reservoir to the several hydraulic cylinders of the machine, and a motor 46 is carried by the vehicle portion 2 and drives the pump 47. The oil or the like under pressure flows through suitable lines to and from the several hydraulic cylinders, and a manually operable valve control means 34 is provided at the stand 31. This valve control means 34 is operated by the operator to control the flow of hydraulic fluid to and from the several cylinders of the machine. The left portion 44 of the vehicle portion 1, as viewed in FIGS. 1 and 3, houses batteries which supply the electric current for the motors 16, 17 and 46, the circuits from the batteries to these motors not being shown and being controlled through switches accessible to the operator at the stand 31.

Figure 6:
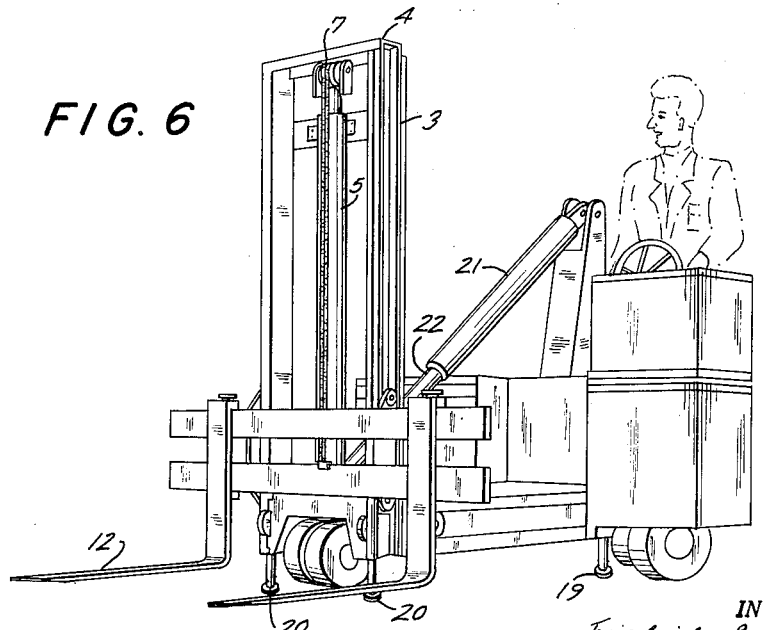
FIG. 6 is a perspective view of the machine of FIGS. 1-4 with the wheels thereof in the position shown in FIG. 4 and with the material lifting structure in an extended position preparatory to engaging the material.

In the perspective view of the machine of the invention which is shown in FIG. 5 the wheels of the vehicle have the position illustrated in FIGS. 1–3 and the main frame 3 together with all of the structure carried thereby is retracted into the cutout 48. In FIG. 6 the wheels of the vehicle are shown in the position of FIG. 4 and liquid under pressure has been supplied to the cylinder 21 so as to advance the main frame 3 together with all of the structure carried thereby to the forward position shown in FIG. 6. It will be noted also that the piston which cooperates with the cylinder 5 has moved downwardly from the position of FIG. 5 to that of FIG. 6 in order to lower the fork-forming elements 12 so that they are at the floor level or just above the floor preparatory to engaging a load. Where this load is in the form of long highly flexible members, the main frame 3 may be retracted to the position shown in FIG. 5, and before the load is lifted the elements 12 are moved out to positions adjacent the ends of the members 11, and then the carriage 9, 11 is adjusted to the elevation shown in FIG. 5 where the top surfaces of the horizontal portions of elements 12 are at the same elevation as the top surface of the auxiliary vehicle portion 2, so that this auxiliary vehicle portion forms a central support for the load which is also supported by the pair of elements 12, and in this way a long flexible load can be reliably supported and transported by the machine of the invention.

It should be noted that with the embodiment of FIGS. 1–4, it is possible to slip additional fork-forming elements 12 onto the horizontal carriage elements 11, if desired.

By arranging the wheels 14 and 15 adjacent the ends of the longitudinal main vehicle portion 1, the length of the vehicle can be quite small while at the same time the steering movements of both wheels 14 and 15 enable the vehicle to maneuver along very sharp, small curves.

The auxiliary vehicle portion 2 need not be rectangular, and may have any other desired shape. For example, this auxiliary vehicle portion may be round where it is desired to guide the main frame 3 and the structure carried thereby for turning movement toward the front and rear of the longitudinal vehicle portion 1.

Figure 7:
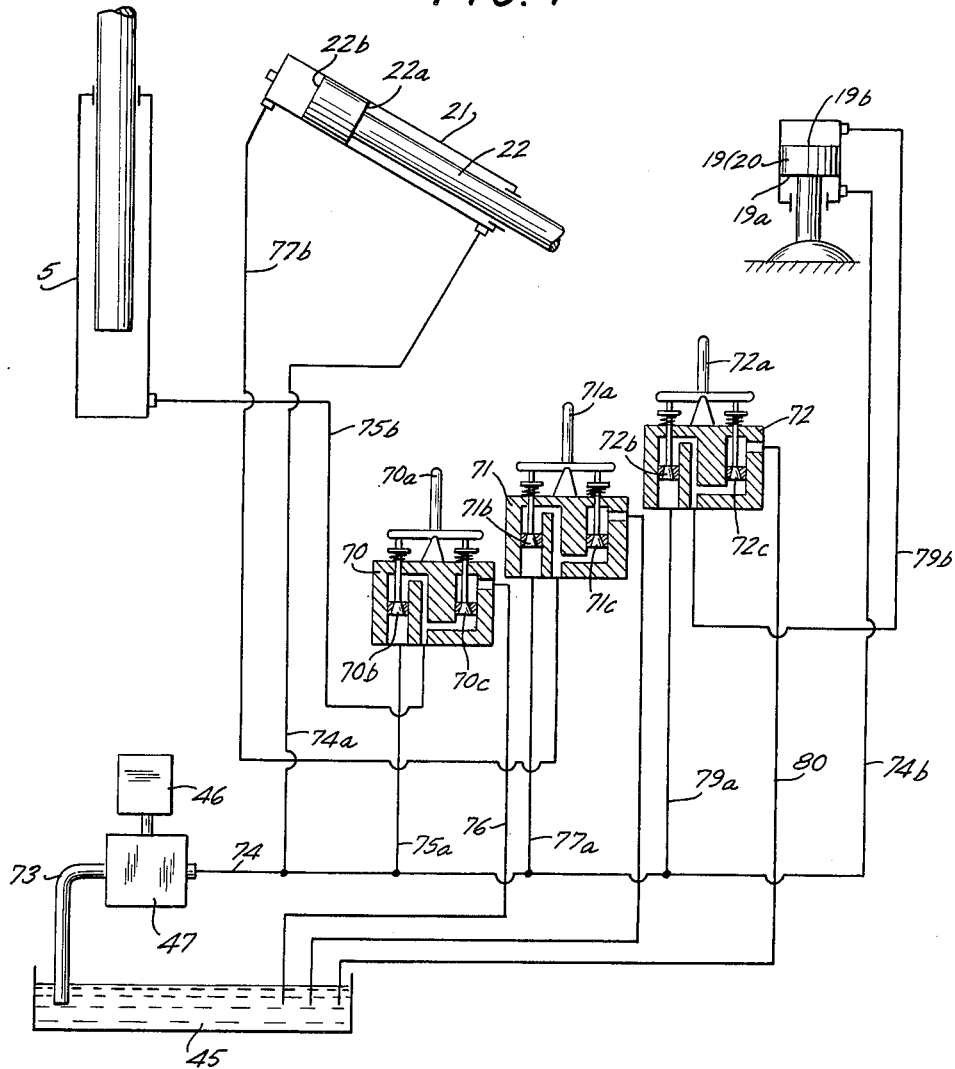
FIG. 7 schematically shown the hydraulic circuit for the structure of the invention.

Referring now to FIG. 7, the hydraulic control 34 shown in FIG. 1 is actually in the form of three valve assemblies 70, 71, 72 each having its own manual control 70a, 71a, 72a, respectively. The valve assembly 70 includes the valves 70b and 70c, the valve 70b being opened when the linkage of the control 70a is turned in a counterclockwise direction, as viewed in FIG. 7, so as to lower the left valve operating stem and raise the right valve operating stem of the assembly 70. When the control 70a is turned in a clockwise direction, as viewed in FIG. 7, the left valve operating stem is raised and the right valve operating stem is lowered so as to open the valve 70c and leave the valve 70b closed, both of these valves being closed when the control 70a has the neutral position shown in FIG. 7.

The valve assembly 71 has the same construction as the valve assembly 70 and includes the valves 71b and 71c operated by the control 71a in the manner described above in connection with the valve assembly 70. The valve assembly 72 includes a pair of valve members 72b and 72c, and this valve assembly is identical with the other assembly 70 and 71 and operates in the same way.

The hydraulic connections for all of the jacks 19 and 20 are identical, so that only one of these jacks and its hydraulic connections is shown in FIG. 7. FIG. 7 also shows the cylinder 21 and piston 22, as well as the cylinder 5 and the piston therein. Furthermore, FIG. 7 shows the reservoir 45, the pump 47, and the motor 46, the actual position of these components being shown in FIG. 3 and described above. Oil or other hydraulic liquid is withdrawn from the reservoir 45 into the pump 47 through the suction conduit 73 communicating with the reservoir and the suction side of the pump 47. The pressure discharge conduit 74 leading from the pump 47 has a branch 74a in constant communication with the interior of cylinder 21 at the lower portion thereof so that the liquid under pressure always acts against the annular surface 22a of the piston 22, during operation of the machine. The pressure conduit 74 also has a branch 74b in communication with a lower portion of the cylinder of jack 19 so that the fluid under pressure acts at all times during operation of the machine against the downwardly directed annular surface 19a of the piston of the jack 19. Additional branches communicate in the same way with the remaining jacks 19 and 20.

A conduit 75a leads from conduit 74 to valve 70b and from the latter a conduit 75b leads to the cylinder 5, so that when the control 70a is actuated to open the valve 70b, the hydraulic fluid under pressure will flow from conduit 74, through conduit 75a, valve 70b, and conduit 75b to the cylinder 5 to raise the piston thereof. A branch of the conduit 75b leads to the valve 70c, and a discharge conduit 76 leads from valve 70c back to the reservoir 45, so that when the valve 70c is opened the piston in the cylinder 5 will move downwardly by gravity and discharge the hydraulic liquid through conduit 75b, valve 70c, and conduit 76 to the reservoir 45.

A conduit 77a leads from pressure conduit 74 to the valve 71b, and a conduit 77b leads from the valve 71b to the top end of the cylinder 21, so that when the valve 71b is opened the liquid under pressure will flow through conduit 74, conduit 77a, valve 71b, and conduit 77b into the cylinder 21 to act against the circular end face 22b of the piston 22. Since this face 22b has an area greater than the annular surface 22a, the piston 22 will be displaced from the cylinder 21. When the valve 71c is opened, the conduit 77b communicates through a branch thereof with this valve and the liquid can flow through conduit 77b and valve 71c to a conduit 78 which leads from the valve 71b back to the reservoir 45, so that at this time the pressure acting on surface 22a will return the piston 22 into the cylinder 21.

A conduit 79a leads from pressure conduit 74 to the valve 72b, and a conduit 79b leads from the valve 72b to the upper part of the cylinder of jack 19, so that when the valve 72b is opened the fluid under pressure will act on the top face 19b of the piston of jack 19, and since this face 19b has an area greater than annular surface 19a the cylinder of jack 19 will move upwardly. The other jacks operate the same way. A branch of the conduit 79b leads to valve 72c, and a conduit 80 leads from the valve 72c back to the reservoir 45, so that when the valve 72c is opened the cylinder of the jack 19 moves downwardly, and the other jacks operate in the same way.

Of course, conduits such as those leading to the movable cylinder 21 and the cylinders of the jacks are flexible to permit movement of the cylinders while maintaining the hydraulic communication therewith.

It will be understood that each of the elements described above, or two or more together, may also find a useful application in other types of material handling machines differing from the types described above.

While the invention has been illustrated and described as embodied in a fork lift truck, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a material handling machine, in combination, a longitudinal main vehicle portion; a single auxiliary transverse vehicle portion fixed to and extending laterally from said longitudinal main vehicle portion spaced from both ends thereof so that said longitudinal main vehicle portion includes projecting main vehicle portions located on opposite sides of said auxiilary transverse vehicle portions; rotatable supporting means on both said projecting main vehicle portions located on opposite sides of said auxiliary transverse vehicle portion; a main frame extending upwardly from said auxiliary vehicle portion; guide means carried by said auxiliary vehicle portion and cooperating with said main frame to guide the latter for movement along said auxiliary vehicle portion in a direction transverse to said main vehicle portion; and load-engaging means carried by said main frame for raising and lowering material which is to be transported, said load-engaging means including a carrier extending longitudinally of said main vehicle portion and a pair of load-engaging elements carried by said carrier adjustably therealong between a position in which said load-engaging elements are located substantially adjacent said auxiliary transverse vehicle portion and a position in which they are spaced therefrom, whereby the distance between said load-engaging elements and said auxiliary transverse vehicle portion may be adjusted, and said rotatable supporting means are located outwardly of said load-engaging elements when the latter are located adjacent said auxiliary transverse vehicle portion.

2. In a material handling machine, in combination, a longitudinal main vehicle portion; a transverse auxiliary vehicle portion fixed to and extending laterally from said longitudinal main vehicle portion; a main frame extending upwardly from said auxiliary vehicle portion; guide means carried by said auxiliary vehicle portion and cooperating with said main frame to guide the latter for movement along said auxiliary vehicle portion in a direction transverse to said main vehicle portion, said guide means and said main frame being supported only by said auxiliary vehicle portion; load-engaging means carried by said main frame extending longitudinally along said main vehicle portion for raising and lowering material which is to be transported, said load-engaging means including an elongated fork carrier which extends longitudinally of said main vehicle portion beyond said auxiliary vehicle portion on both side of the latter and a pair of fork-forming elements adjustably carried by said fork carrier for movement therealong so that the distance between said elements may be adjusted, said transverse vehicle portion being located between said fork-forming elements when the latter are at the elevation of said transverse vehicle portion; and a plurality of wheel means supporting said vehicle portions for movement along a surface engaged by said plurality of wheel means, one of said wheel means being connected with said main vehicle portion and another of said wheel means being connected with said auxiliary vehicle portion for stabilizing and transporting said material handling machine.

3. In a material handling machine, in combination, a longitudinal main vehicle portion; a single transverse auxiliary vehicle portion fixed to and extending laterally from said longitudinal main vehicle portion; a main frame extending upwardly from said auxliary vehicle portion; guide means carried by said auxiliary vehicle portion and cooperating with said main frame to guide the latter for movement along said auxiliary vehicle portion in a direction transverse to said main vehicle portion, said guide means and said main frame being supported only by said auxiliary vehicle portion; load-engaging means carried by said main frame extending longitudinally along said main vehicle portion for raising and lowering material which is to be transported, said load-engaging means including an elongated fork carrier extending longitudinally of said main vehicle portion and a pair of fork-forming elements adjustably carried by said fork carrier for movement therealong so that the distance between said elements can be adjusted, said transverse vehicle portion being located between said fork-forming elements when the latter are at the elevation of said transverse vehicle portion; a plurality of wheel means supporting said vehicle portions for movement along a surface engaged by said plurality of wheel means, said wheel means being connected with said main vehicle portion and said auxiliary vehicle portion for stabilizing and transporting said material handling machine; and manually operable turning means operatively connected with said wheel means for turning the same.

4. In a material handling machine, in combination, a longitudinal main vehicle portion; at least one transverse auxiliary vehicle portion fixed to and extending laterally from said longitudinal main vehicle portion; a main frame extending upwardly from said auxiliary vehicle portion; guide means carried by said auxiliary vehicle portion and cooperating with said main frame to guide the latter for movement along said auxiliary vehicle portion in a direction transverse to said main vehicle portion; means carried by said main frame for raising and lowering material which is to be transported; a pair of wheel means respectively located adjacent the ends of said longitudinal vehicle portion and a third wheel means located adjacent the end of said auxiliary vehicle portion which is distant from said longitudinal vehicle portion, all of said wheel means supporting the vehicle portions for movement along a surface engaged by the plurality of wheel means; manually operable turning means operatively connected with the plurality of wheel means for turning the same between a first position where they direct the vehicles portions longitudinally of said longitudinal vehicle portion and a second position where they direct the vehicle portions transversely of the longitudinal vehicle portion, said manually operable turning means including a first assembly connected only with said pair of wheel means and a second assembly connected only with said third wheel means, whereby when the plurality of wheel means are in their first position the first assembly of said turning means may be used for steering the vehicle while when said plurality of wheel means are in their second position said second assembly is used for steering the vehicle.

5. In a machine as recited in claim 4, and jack means carried by said vehicle portions for raising the entire vehicle when the plurality of wheel means are turned between said positions thereof.

6. In a machine for handling material, in combination, a longitudinal main vehicle portion; a single auxiliary transverse vehicle portion fixed to and extending laterally from said main vehicle portion substantially midway between the ends thereof so that said vehicle portions together form a vehicle which in plan has a substantially T-shaped configuration; a main frame extending upwardly from said auxiliary vehicle portion; guide means carried by said auxiliary vehicle portion and cooperating with said main frame to guide the latter for movement along said auxiliary vehicle portion in a direction transverse to said main vehicle portion; and means carried by said main frame for raising and lowering material which is to be transported.

7. In a machine as recited in claim 6, said means carried by said main frame for raising and lowering material including a fork carrier carried by said main frame and being substantially coextensive with said longitudinal main vehicle portion; and a plurality of fork-forming elements adjustably carried by said fork-carrier for adjustable movement there along so that the distance between said fork-forming elements is adjustable and so that a pair of fork-forming elements may be located substantially at the ends, respectively, of said longitudinal vehicle portion at the elevation of the said auxiliary vehicle portion with the latter located substantially midway between the pair of fork-forming elements so that long flexible members may be supported not only by the pair of fork-forming elements but also by the auxiliary vehicle portion.

8. In a material handling machine, in combination, a longitudinal main vehicle portion; an auxiliary vehicle portion fixed to and extending laterally from said longitudinal main vehicle portion at one side of the latter substantially midway between the ends thereof so that said vehicle portions together form a vehicle which in the plan has a substantially T-shaped configuration; a pair of wheel means respectively located adjacent the ends of said longitudinal main vehicle portion and a third wheel means located adjacent the free end of said auxiliary vehicle portion, all of said wheel means supporting said vehicle portions for movement longitudinally of said main vehicle portion; means cooperating with said third wheel means for preventing turning of the latter with respect to said auxiliary vehicle portion; and means cooperating with said pair of wheel means for simultaneously turning the latter in opposite direction so that said pair of wheel means may be turned to steer the vehicle.

References Cited by the Examiner
UNITED STATES PATENTS

| 2,424,741 | 7/1947 | Chambers. | |
| 2,520,835 | 8/1950 | England | 180—27 X |
| 2,608,315 | 8/1952 | Turner | 214—731 |
| 2,621,812 | 12/1952 | Lull | 214—75 |
| 2,661,672 | 12/1953 | Fairbanks | 280—47.11 X |
| 2,748,966 | 6/1956 | Gohrke | 214—731 |
| 2,752,056 | 6/1956 | Lull | 214—660 |
| 2,756,885 | 7/1956 | Ackermann | 214—514 |
| 2,828,027 | 3/1958 | Stevenson et al. | 214—38.40 |
| 2,897,985 | 8/1959 | Carlson | 214—75 |
| 2,995,263 | 8/1961 | Fitch | 214—731 |

FOREIGN PATENTS

| 482,944 | 2/1917 | France. |
| 1,093,804 | 11/1954 | France. |
| 752,953 | 7/1956 | Great Britain. |

GERALD M. FORLENZA, *Primary Examiner.*

HUGO O. SCHULZ, ERNEST A. FALLER, MORRIS TEMIN, *Examiners.*